June 15, 1965  E. L. McFERREN ETAL  3,188,891
MACHINE TOOL

Filed Jan. 8, 1963  6 Sheets-Sheet 1

INVENTORS
Edgar L. McFerren
Walter L. McCann
Gordon H. Jones
Wolfe, Hubbard, Voit & Osann
ATTORNEYS

United States Patent Office 3,188,891
Patented June 15, 1965

3,188,891
MACHINE TOOL
Edgar L. McFerren, Walter L. McCann, and Gordon H. Jones, Fond du Lac, Wis., assignors to Giddings & Lewis Machine Tool Company, Fond du Lac, Wis., a corporation of Wisconsin
Filed Jan. 8, 1963, Ser. No. 250,138
5 Claims. (Cl. 77—3)

This invention relates generally to machine tools and more particularly to improvements in machine tools such as horizontal boring mills.

One of the general objects of the present invention is to improve machining accuracies obtainable with machine tools, such as horizontal boring mills, of the type involving large, column supported, heavy duty headstocks, and massive frames for supporting the workpieces to be machined with cutting tools operated by such headstocks. More specifically, an object of the invention is to improve machining accuracies by more effectively isolating heat generated in the transmission from the main machine frame and related elements during its operation, thereby minimizing the distortion producing effects of such generated heat in the column, headstock, and frame elements.

Another object of the invention is to improve machining accuracies in such types of machine tools by mounting the column independently of the transmission so as provide a more rigid headstock and cutting tool supporting structure. A related object is to provide a machine tool transmission which is not only independently mounted of the column but is also removable as a unit from the machine tool for interchangeability purposes and to permit ready access for maintenance and repair.

Another object is to provide an improved workpiece support drive means for use in machine tools, such as horizontal boring mills, having an elevatable headstock carried above the workpiece support, which drive means affords selection of workpiece feeds in inches per revolution of the spindle and inches per minute, as desired thus adding materially to the versatility of the machine tool.

The foregoing objects and advantages, as well as others, will become more apparent from the following detailed description, when read in conjunction with the appended drawings, wherein.

While the invention is susceptible of various modifications and alternative constructions, an illustrative embodiment has been shown in the drawings and will be described below in considerable detail. It should be understood, however, that there is no intention to limit the invention to the specific form disclosed, but, on the contrary, to cover all modifications, alternative constructions and equivalents falling within the scope of the invention as expressed in the appended claims.

GENERAL ORGANIZATION OF THE MACHINE ELEMENTS

Figure 1:
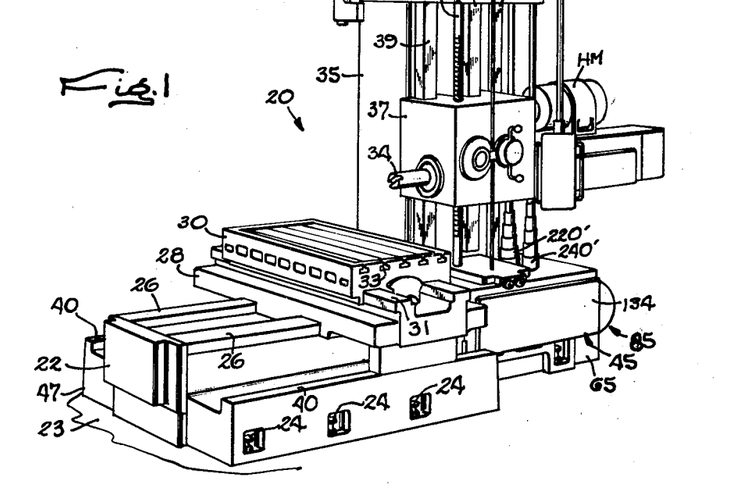
FIGURE 1 is a perspective view of a horizontal boring and milling machine constructed in accordance with the present invention.
Figure 2:
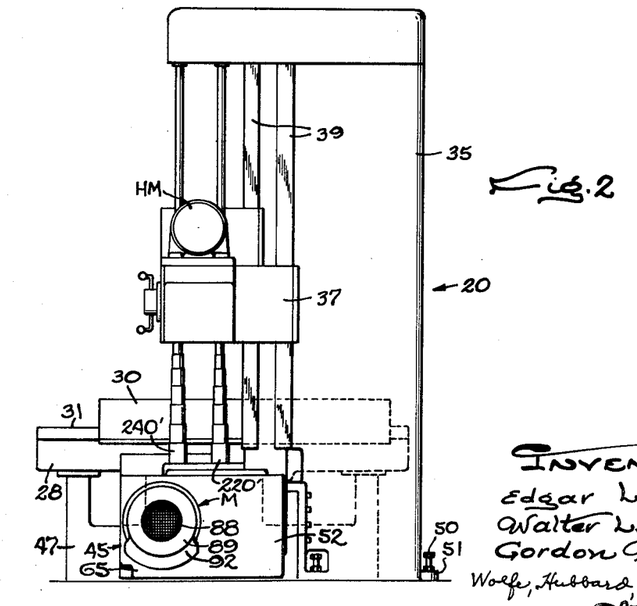
FIG. 2 is a right end elevational view of FIGURE 1 of the same machine.
Figure 4:
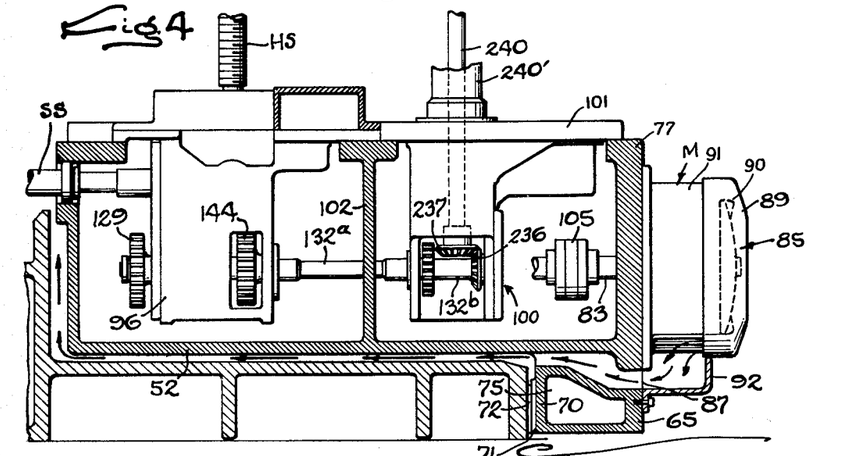
FIG. 4 is a partial sectional view of the transmission unit of FIG. 3 taken along the line 4—4 of FIG. 7.
Figure 10:
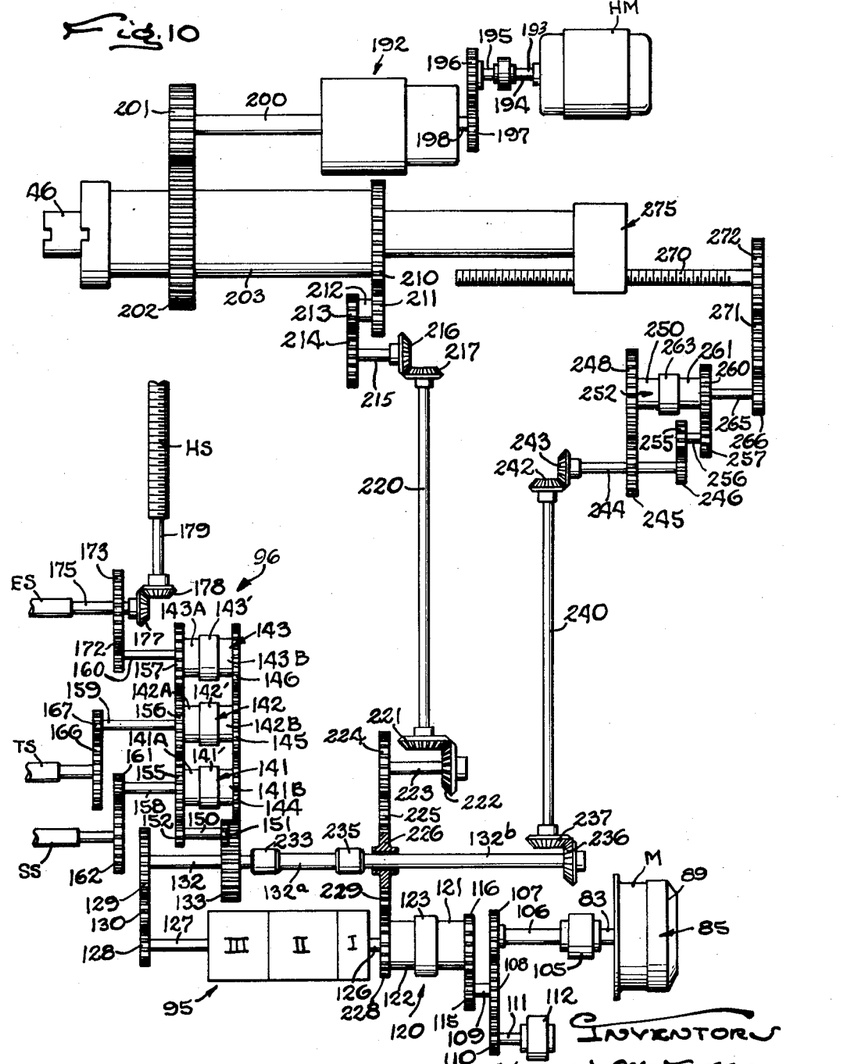
FIG. 10 is a schematic representation of the power drive arrangement of the present invention.

Referring more specifically now to the drawings, and in particular, to FIGURES 1 and 2, an improved horizontal boring and milling machine, indicated generally at 20, is illustrated. The identity and general physical relationship of the various components of the machine will be recognized as comprising a bed 22 which is secured to a foundation 23 by appropriate means, such as bolts 24. The bed 22 is elongated and is provided with parallel ways 26 extending longitudinally along the bed. For supporting a workpiece for machining operations a saddle 28 is disposed transversely on the ways 26 in bearing relation and is slidable along the ways being translatable by a feed screw SS as shown in FIGS. 4 and 10. The saddle is adapted to support a table 30 on which the workpiece is carried, by means of parallel ways 31 formed thereon and provides for movement of the table in a direction transverse to the longitudinal axis of the bed 22 by means of a screw TS as shown in FIG. 10. The table 30 is provided with a plurality of longitudinal T slots 33 which are employed, with appropriate clamps not shown in securing the workpiece to the table.

The workpiece support above described is operated by drive means so as to position the workpiece relative to a cutting tool mounted in a spindle 34 of a headstock 37 supported for vertical movement on parallel vertical ways 39 formed on or otherwise attached to an upright column 35. A feed screw HS, as shown in FIGS. 4 and 10, extends vertically from a power transmission unit 45 located (as shown in FIGURE 1) at the foot of the column and is employed to elevate and lower the headstock on the column ways 39.

Accessory to the basic machine, the bed is provided with outboard parallel table support members 47 having ways 40 thereon, which may be used to provide additional support for the saddle 28 extending transversely of the bed. Other accessories, commonly used on horizontal boring and milling machines, may also be utilized, but are omitted for convenience in description.

For feeding the saddle 28 and headstock 37 manually, hand wheels may be connected through the feed transmission to the respective feed screws SS, HS. Similar hand operated control means (not shown) may be provided for the table 30.

MOUNTING AND SUPPORT OF THE COLUMN AND TRANSMISSION UNIT

Figure 8:
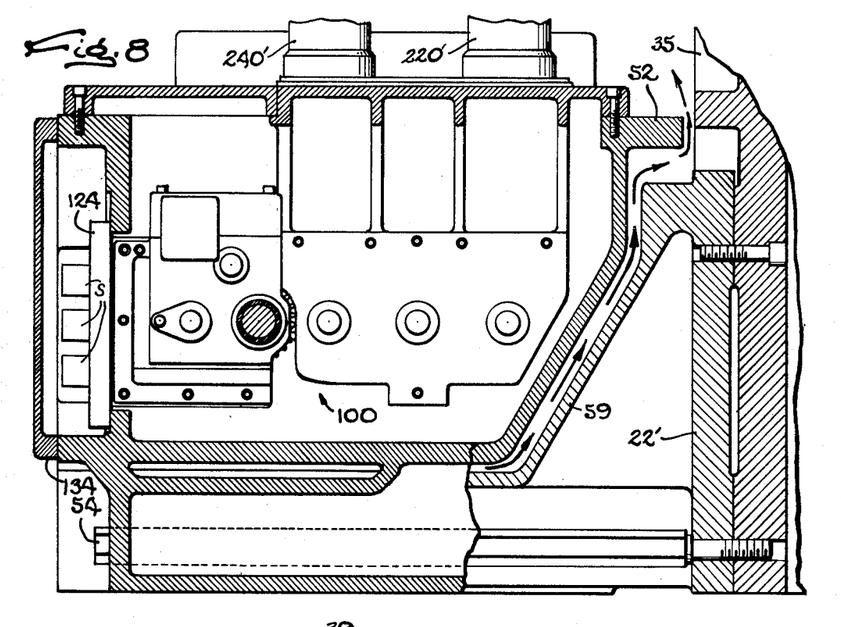
FIG. 8 is a partial section taken along the line 8—8 of FIG. 7 with a portion of the bed and transmission housing being broken away to show the internal structure.
Figure 9:
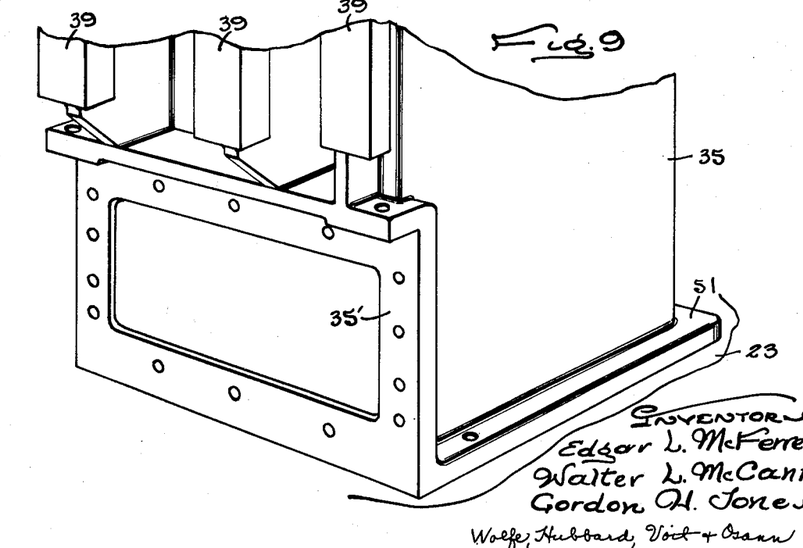
FIG. 9 is a perspective view of the lower portion of the column.

The invention, in one of its aspects, contemplates mounting and support of the column and power transmission unit so as to increase the accuracy, reliability and overall performance of the machine tool. Reference will be had to FIGS. 8 and 9 in particular, where the lower section of the column 35 is illustrated. In keeping with this aspect of the invention, the column is mounted directly to the foundation 23 by appropriate means, such as bolts 50 (FIG. 2) which pass through a flange 51 on the bottom of the column and into the foundation. It will be apparent to those skilled in the art that studs imbedded in the foundation and passing upward through the flange 51 would be a satisfactory method of securing the column. This is to be distinguished from the usual horizontal boring and milling machines where the column is mounted directly to the bed and supported thereby, thus subjecting it directly to the detrimental effects of vibration and heat generated particularly in the transmission unit. Another feature of the present construction is the provision of lateral support for the column 35. For this purpose the column 35 is also rigidly fastened on the front 35′ of the lower section thereof to an adjacent upstanding wall 22′ of a section of the machine tool bed 22 which houses the transmission unit 45, by means such as bolts 54 (FIG. 8). As shown in FIG. 9, the column in this column in this lower section is provided with a plurality of holes to receive such bolts 54. By mounting a column 35 directly to the foundation 23 with collateral stabilizing support in a horizontal plane being provided by the bed itself, a more rigid support is provided for the headstock and spindle when working on a workpiece secured to the table.

TRANSMISSION UNIT

Figures 5, 6:
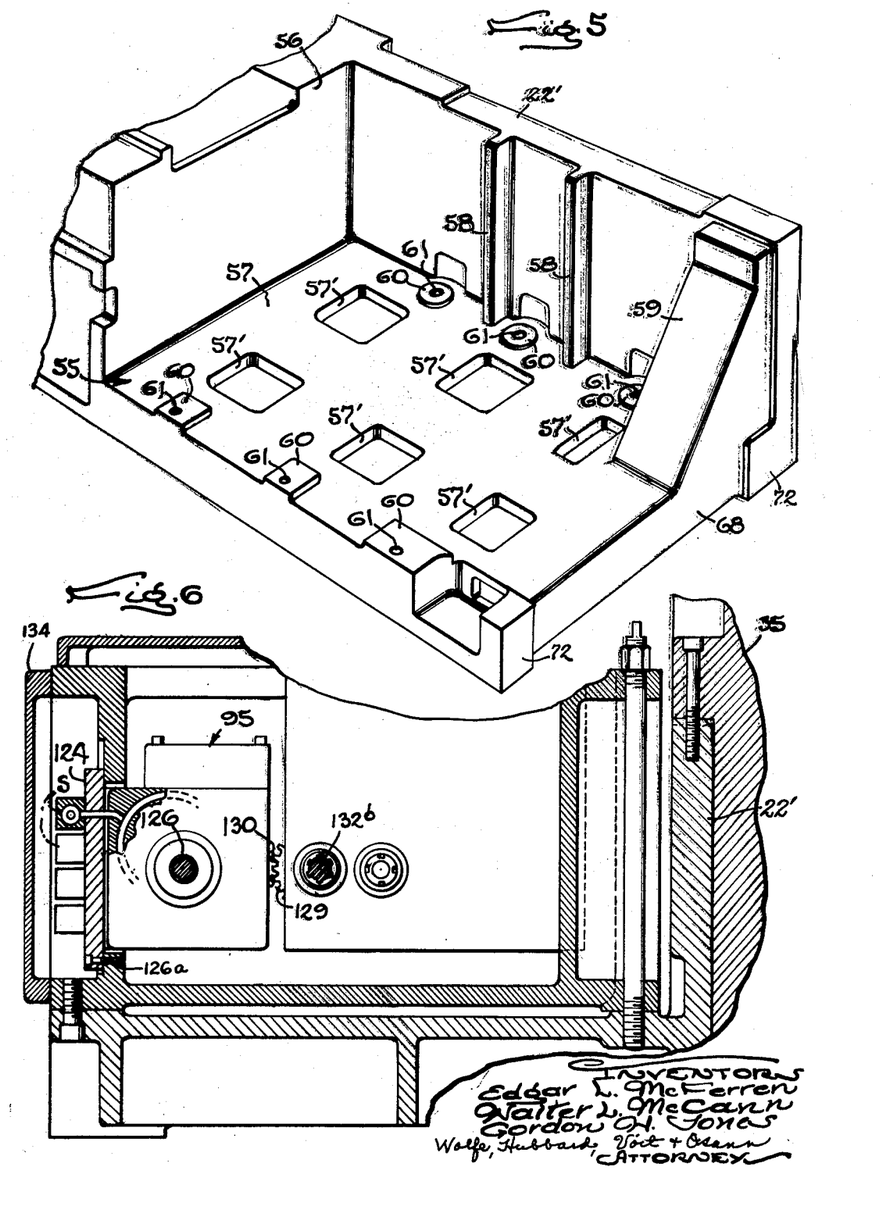
FIG. 5 is a perspective view of a portion of the bed of the machine of FIG. 1, illustrating the transmission cavity.
FIG. 6 is a partial sectional view of the transmission unit as mounted in the cavity of FIG. 5, taken along the line 6—6 of FIG. 7.

In a further carrying out the objective of insulating the column 35 and thereby the cutting tool from the heat generated in the operation of the power transmission unit 45, this transmission unit is mounted independently of the column and on the bed 22. To this end, the transmission unit is wholly disposed within a transmission casing 52 which is mounted in a cavity 55 provided (as shown in FIG. 5) for this purpose in the machine bed. The cavity 55 is defined by the upright wall 22′ to which the column 35 is fixed, the end 56 of the main section of the bed 22, and a waffle-like floor portion 57 having symmetrically spaced rectangular depressions 57′. A pair of vertical ribs 58 are formed on the wall 22′ to strengthen the same and a relatively thick triangular shaped rib 59 is provided near the end of the wall 22′ having its base at the floor 57 of the cavity. Pursuant to this aspect of the invention, the cavity is constructed to receive the transmission unit 45 in such a manner as to leave channels for the circulation of air about the transmission unit casing 52 for ventilation and cooling thereof. Thus, the floor 57 of the transmission cavity 55 is provided with a plurality of raised portions or pads 60 which may assume any appropriate shape, rectangular or circular, as will appear from FIG. 5, and may be conveniently formed integrally with the bed casting or separately without departing from the invention. The transmission casing 52 is adapted to rest on the pads 60, and holes 61 therein are adapted to be aligned with similarly disposed holes in the transmission casing 52 to receive bolts to hold the transmission unit securely to the bed 22 within the cavity. With the transmission so installed, it will be observed that transmission casing 52 is spaced from the walls of the cavity 55 a small distance, and is further elevated from the cavity floor by the height of the pads 60. In this manner, channels are defined between the transmission unit casing and the walls of the cavity for the circulation of coolant, such as air. Thus, with metal to metal contact between the transmission and bed at a minimum, the transfer of heat to the latter by conduction is minimized. By circulating coolant such as air through the channels defined around the transmission casing, by means to be described below, the heat generated by friction within the transmission is removed for the purpose of reducing the effects of thermal distortion on the adjacent portions of the bed and column.

FEED TRANSMISSION

Figure 3:
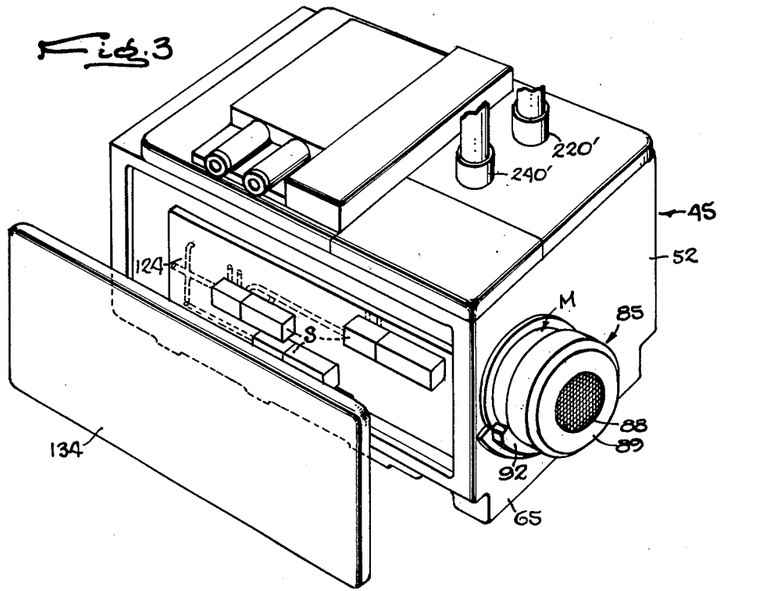
FIG. 3 is a perspective view of a power transmission unit employed with the machine, with the cover plate removed.

Turning now to FIG. 10, it will be seen from this figure that the transmission unit 45 is employed in the machine tool to supply power for workpiece positioning and to elevate and lower the headstock. Thus, the transmission unit 45 is connected to the saddle lead screw SS, the table lead screw TS, the end support lead screw ES and the headstock lead screw HS. One of the features of the invention is the selection of feed rates in either inches per minute or inches per revolution of the tool spindle. In carrying out this feature, the transmission unit is connected to one of two power sources, the motor M in the transmission unit, or the headstock drive motor HM through a power transmission loop comprising the vertical shafts 220, 240 and the spindle drive gearing. With this power loop operative, the transmission affords table feeds directly related to rotational speeds of the tool spindle. How this is achieved will be set out more completely below. It is important to observe at this point that the transmission unit 45 comprises the power train elements in the lower portion of FIG. 10, and while such unit is carried within the transmission cavity 55 in the bed, that it is also selectively drivingly connected by means of a power transmitting loop to the headstock spindle drive motor HM. Referring now to FIGS. 3 through 5, it will be seen that the casing 52 which houses the transmission unit 45 is secured to the floor 57 of the cavity. This casing is constructed to conform to the cavity 55 providing air space between the walls of the cavity and the transmission casing. At one end thereof, the casing is provided with a depending portion 65, which overhangs the floor 57. This depending portion 65 is constructed to aid in aligning the transmission in the cavity. Thus, the inner vertical wall 70 of the depending portion 65 is provided with an alignment pad 71 which presents a finished surface to an associated alignment pad 72 disposed on the terminal wall 68 of the bed. The pads 71 and 72 may be used so as to provide longitudinal alignment of the transmission unit 45. Shims may be used in a well-known manner to perfect alignment. In addition to providing alignment for the transmission unit, the depending portion 65 encloses a reservoir 75 which serves as a lubricating oil sump for the transmission.

Thus, end portion 65 of the transmission unit 45 which projects from the terminal end of the bed includes a rear wall 77 in which the motor M is journalled in a particularly expedient location, conveniently accessible and exposed to free circulation of air for cooling purposes and to provide an inlet for coolant air to be circulated about the transmission casing.

Transmission cooling

The motor M itself may be of any convenient, well-known construction. In the present instance, however, it is desirable, in keeping with the invention to equip the same with a fan arrangement, such as that indicated at 85, at the rear of the motor M. The fan 85 communicates with the air passages or channels defined between the casing 52 and the walls of the cavity formed in the machine bed, through a lateral air passage 87 cast in the housing 52. In operation, fresh air is drawn in through a screen 88, disposed in the hood 89, which covers an impeller 90, attached to the armature shaft of the motor. The hood is conveniently larger than the motor casing 91, in the region of the passage 87, and a flanged member 92 is bolted or otherwise fastened to the depending portion 65 of the transmission casing, where it forms a passage between the space between the hood 89 and the motor casing 91, and the passage 87. Thus, air is drawn axially through the screen 88 and impelled outwardly where it is directed by the hood 89 through the passage 87 and between the transmission casing and supporting cavity, thereby providing circulating air for dissipation of heat created in the transmission proper. The circulation of the air is indicated particularly in FIGS. 4 and 8 by arrows.

Transmission multispeed drive arrangement

Looking now to the details of the power unit 45, it will be appreciated that it is desirable to provide a transmission which transmits the power generated by the motor M as efficiently as possible and in the largest possible variety of selectively different ratios. Since multispeed transmissions are often complex and quite expensive, it is also desirable to provide such a transmission which accomplishes the tasks required of it while being as simple and economical of construction as possible. Such a transmission is disclosed herein and illustrated in varying degrees of particularity in each of FIGS. 3, 4, 7, 8 and 10.

In order to simplify maintenance, repair and replacement of transmission parts, the transmission is itself divided into operative units which are removable as such without requiring changes to be effected in other units within the transmission. Such units include, as shown in FIG. 7, a multispeed planetary transmission 95, a clutch unit 96 for selectively coupling the output of the planetary transmission 95 to the lead screws SS, TS, ES or HS, and a drive transfer unit 100 for coupling the planetary transmission 95 to one of two sources of power—the motor M or the headstock drive motor HM.

Drive transfer unit

Figure 7:
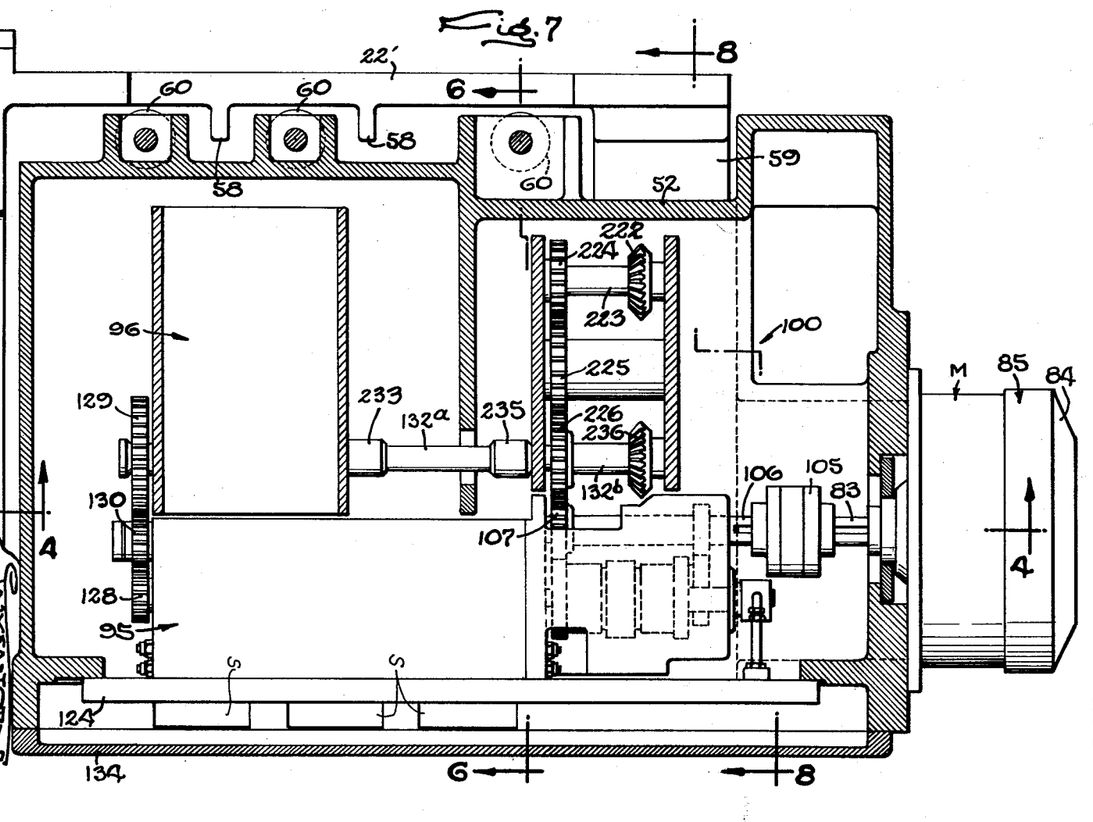
FIG. 7 is a plan view of the transmission with a portion of the casing removed.

Referring particularly now to FIGS. 4, 7 and 10 for details of such drive transfer unit 100, it is secured to a plate 101 (FIG. 4) which is supported at the top of the transmission unit 45 by the terminal wall 77 of the casing and an inwardly disposed reinforcing wall 102. The drive transfer unit is coupled with the motor shaft 83 by means of coupling 105 and shaft 106 which carries a gear 107. The gear 107 meshes with the gear 108 disposed on a countershaft 109. The gear 108 also meshes with a gear 110, which is mounted on a shaft 111 for driving a sump pump 112, disposed within the sump 75 in the depending portion 65 of the transmission casing. A gear 115 is disposed on the countershaft 109 opposite the gear 108 and is in mesh with a gear 116 formed on the input side of a clutch indicated generally at 120.

The clutch 120 of the drive transfer unit 100 is operable to select one of two power paths through the transmission, and, as an incident thereto, to connect the planetary transmission unit 95 to one of two power sources—the transmission unit motor M or the headstock drive motor HM. Thus, the clutch 120 may be of any suitable type herein shown as a pair of axially disposed, powered spaced input members 121 and 122, and a slidable collar 123 between them. As shown in FIG. 10, the power member 121 is driven from the transmission unit drive motor M while the power member 122 is driven from the headstock drive motor HM through a power train including the vertical shaft 220 and spur gears 228, 229. The collar 123 is secured to the input shaft 126 of the planetary transmission unit and is adapted to be selectively engaged with either of the power members 121 or 122 by multiple friction disc clutch assemblies well known in the art. The individual disc plates in each assembly are alternately secured to the power and input members. When brought into frictional engagement by pressure means, a drive coupling is effected between the power and input members.

Planetary drive and control therefor

The heart of this highly versatile feed transmission is a planetary transmission unit indicated generally at 95. The planetary transmission 95 is a composite of a number of individual interchangeable sections illustratively designed I, II, III selected from a variety of such sections which may be available for building a different transmission having desired characteristics. It is contemplated to provide a number of such sections, all of which are mateable with one another and cooperable to provide the desired number and type of speed changes for a given range of machine operation. Transmissions of the type indicated at 95 are more fully disclosed in copending application Serial No. 232,339, filed October 17, 1962.

Because of the interchangeable nature of the sections, a unit 95 may be assembled and secured directly to a laminated manifold plate such as at 124. As set forth in detail in said application Serial No. 232,339, each section I, II and III comprises a casing 125 within which the planetary drive components of the respective section are rotationally mounted. Such casings 125 are secured to the manifold plate such that the plate not only provides for their sole support within the transmission, but provides fluid communication through passages formed therein to brakes in each unit, thereby eliminating the necessity of separate mounts and awkward pressure hoses for each section. Thus, as shown in FIGS. 3, 6 and 8, the unit 95 is conveniently mounted by its manifold plate 124 which is fixed by bolts 126a. The open front side of the casing 52, through which the transmission 95 is accessible, is provided with a protective cover 134. Appropriate fluid controls may be provided including solenoid valves S mounted directly to the manifold plate connected to a fluid pressure source for accomplishing ratio changes and shifting of the transmission unit brakes as required.

By the use of planetary gears, it will be appreciated that a larger number of ratios are made available within a small space, and control of selectivity is greatly simplified. The planetary transmission unit 95 receives input through the clutch 120 when the same is positioned for providing such input through the shaft 126 attached to the clutch collar 123 and delivers the same, as modified by the preselected ratio established in the transmission unit 95, through the output shaft 127 to a pinion 128 secured thereto.

Clutch unit

In the present case, power is transmitted from the output pinion 128 of the planetary transmission 95 to the different lead screws SS, TS, ES or HS through a clutch unit 96. Connection to the latter from the planetary transmission 95 is via the spur gear 129, idler gear 130, shaft 132 and gear 133. The gear 133 provides the input to the clutch unit 96 which in the feed transmission is located in the front and to one side of the planetary transmission unit 95, as shown in FIG. 7.

The clutch unit includes a plurality of spaced clutches 141, 142 and 143 connected to the input gear 133 through input pinions 144, 145 and 146, respectively, mounted to the input side of the clutches. The particular type of clutch used is a matter of choice, herein shown as a clutch similar to the clutch 120 of the drive transfer unit 100 comprising a slidable internally toothed collar 141', 142', 143', engageable with splined power members 141A, B; 142A, B; 143A, B.

The present arrangement provides a reversible drive to each of the lead screws, either individually or as a group. To this end, an idler gear arrangement comprising a shaft 150 which takes input from gear 133 by means of a pinion 151 disposed on one end of the shaft 150, when operative transfers the input through pinion 152 to the left side of the clutches 141, 142 and 143. The gear 152 meshes with and drives gears 155, 156 and 157 associated with the power members 141A, 142A, 143A, respectively, resulting in the rotation of these members at the same speed, but in a different direction from the rotation of power members 141B, 142B, 143B by gears 144, 145 and 146. Thus, it becomes an easy matter, by simply manipulating the clutch collars 141', 142', 143' which are secured to the clutch output shafts 158, 159, 160, respectively, to provide the desired direction of drive to each of these output shafts.

As will be observed in FIG. 10, clutches 141, 142, 143 via the output shafts 158, 159, 160 thereof, couple a particular machine element lead screw with the output of the transmission unit 95. Thus, the output shaft 158 from clutch 141 carries a pinion 161, which meshes with a gear 162 conveniently secured to the saddle lead screw SS. In a like manner, the table lead screw TS is connected to the clutch 142 through gear 166 to pinion 167 and meshed therewith and carried on the clutch output shaft 159. The clutch 143 drives the headstock elevating screw HS through output shaft 160, which carries a pinion 172 in mesh with a gear 173. As shown, an arrangement is provided for driving both an end support feed screw ES, when the accessory is used, and the headstock elevating screw HS. Thus, the gear 173 is carried by a shaft 175 leading to the end support lead screw ES. The other end of the shaft 175 carries a bevel gear 177 in mesh with a second bevel gear 178, the latter being carried by a shaft 179 attached to the headstock elevating screw HS. Thus, when a workpiece end support means is provided, the vertical movement thereof is coordinated with the movement of the headstock.

HEADSTOCK DRIVE ARRANGEMENT

The machine of the present invention is provided with a separate power drive on the headstock 37. This arrangement advantageously permits the individual and separate power control of the spindle at a convenient number of feeds and speeds. In accomplishing this objective, a motor HM is provided, secured in any suitable manner to the headstock, as seen in FIGURE 1. The motor is preferably of a higher horse power than the transmission unit drive motor M at the bed to satisfy the power requirements of rotating and feeding the headstock spindle, and may suitably be on the order of 20 H.P. and capable of achieving a speed in the range of 1750 r.p.m. The motor HM is adapted to drive the tool spindle 46 at a selectable speed through a planetary transmission arrangement indicated generally at 192. The planetary gear arrangement 192 comprises one or more transmission sections, such as those found in the transmission unit 95 of the feed transmission 45. In order to achieve rotation of the spindle, the motor shaft 193 is connected through a suitable coupling 194 to a shaft 195 which carries a pinion 196. The pinion 196 drives a gear 197 mounted on the transmission input shaft 198. The transmission output is provided through a shaft 200 which carries a pinion 201 in mesh with a gear 202 mounted to the spindle drive sleeve 203. In this manner, rotation of the spindle is effected at a variety of selectable speeds by merely effecting the desired drive path through the planetary transmission arrangement 192.

SELECTIVE INTERRELATION OF TOOL SPINDLE AND FEED DRIVES

A principal attribute of the present invention is a selective interrelation of tool spindle and feed drives whereby feed rates of the saddle, table, end support, and headstock may be provided in either inches per minute or inches per revolution of tool spindle, and further, that such absolute or relative feed rates may be selectively provided for extension or retraction of the spindle.

To this end, a selectively engageable power transmitting connection is provided to convey power from the tool spindle drive of the headstock to the feed transmission in the bed. In the present instance, this power transmitting connection includes a splined vertical power shaft 220 which extends between the headstock 37 and the transmission unit 95 in the bed 22. The vertical shaft 220 is connected to a right-angle drive within the transmission casing 52, which comprises a bevel gear 221 secured to the end of the shaft 220 in mesh with a bevel gear 222 mounted on a horizontal countershaft 223. The shaft 223 carries a pinion 224, which meshes with an idler gear 225. The idler gear 225 in turn meshes with a gear 226 which is journalled about an extension 132(b) of the countershaft 132. The gear is rotatable about shaft 132(b) and is supported thereby in its operative position. The gear 226 drives a gear 228 disposed in driving relation with the input member 122 of the drive transfer clutch 120 through an idler gear 229.

To drive the vertical power shaft 220, it is connected to the tool spindle which in turn is rotatively driven by the headstock drive motor HM. Thus, a gear 210 is provided on the spindle sleeve 203 which meshes with a pinion 211 mounted on a countershaft 212 which has a pinion 213 also disposed thereon. The pinion 213 meshes with gear 214 mounted on a countershaft 215. A bevel gear 216 is provided on a countershaft 215 and engages a second bevel gear 217 slidably receiving the splined power shaft, the latter bevel gear 217 having internal teeth providing a drive connection to the power shaft 220, while permitting the headstock to be raised and lowered with the latter bevel gear 217 sliding on the splined power shaft. A telescoping cover 220' encloses the power shaft 220.

Thus, it will be observed the vertical power shaft 220 is rotated at a rate determined by the rotational speed of the tool spindle and supplies power to the drive transfer clutch 120. The latter is selectively operable to receive power from the vertical power shaft 220, and thus the headstock drive motor HM, by movement of its sleeve 123, and selectively provides a drive through the transmission unit 95 to the translatable elements of the machine in inches per revolution of the spindle simply by moving the coupling member 123 to the left so as to engage the left-hand drive member 122. The transmission input shaft 126 will then be coupled in driving relation to the tool spindle sleeve 203, thereby providing a drive to the screws SS, TS, ES or HS in inches per revolution of the spindle. In a like manner, by moving the coupling 123 to the right so as to engage the right-hand drive member 121, the transmission input shaft 126 will be coupled to the motor M, thereby driving the screws SS, TS, ES and HS at a rate measurable in inches per minute. It will be appreciated by those skilled in the art that such an arrangement is useful in cutting screw threads on a workpiece, for example.

Drive to extend and retract tool spindle

As has been previously indicated, and further in keeping with the invention, a driving connection is also provided between the tool spindle and the feed transmission whereby the spindle may be extended or retracted at a rate measured in either inches per revolution of the spindle or in inches per minute. Such an arrangement is likewise indicated in FIG. 10, where it will be seen that the input shaft 132 to the clutch unit 96 of the feed transmission, has extensions 132(a), 132(b) coupled in tandem to the input shaft by couplings 233 and 235. Such extension shafts 132(a), 132(b) convey power to a vertical power shaft 240 which reaches from the bed 22 upwards to the headstock 37 and is connected therein through gearing to a drive means for extending and retracting the spindle.

This is carried out in a straightforward manner. The shaft 132(b) terminates in a right-angle drive formed by a bevel gear 236 disposed at the end of the shaft 132(b) and which drives a bevel gear 237. The bevel gear 237 is drivingly connected to the lower end of the vertical shaft 240 which is a splined shaft reaching upwards from the feed transmission 45 to the headstock 37 and is slidably received in a bevel gear 242 of a second right-angle drive also including a bevel gear 243 disposed on a horizontal shaft 244. With this arrangement wherein the splined power shaft 240 is slidable through the bevel gear 242, the headstock may be raised and lowered without interference. It will also be noted in FIG. 1 that a telescoping cover 240' encloses this vertical power shaft 240.

The shaft 244 carries a pair of gears 245 and 246, the former being in mesh with a gear 248 attached to the left-hand driving connection 250 of a clutch unit indicated at 252. The clutch unit is employed not only to selectively couple and uncouple the spindle translating means from the power shaft 240 but also to selectively advance or retract the spindle. Thus, the clutch 252 may be of a type similar to that used for the drive transfer clutch 120 in the feed transmission 95, although it will be understood that other types of clutches may be substituted for that shown without departing from the invention. To complete the description of the power train between the vertical power shaft 240 and the clutch 252, still referring to FIG. 10, the gear 246 on the horizontal shaft 244 is in mesh with the gear 255 disposed on a reverse idler shaft 256 which also carries a gear 257. The latter gear 257 is in mesh with a gear 260 which in turn is connected to the right-hand driving member 261 of the clutch 252. A sleeve 263 is slidable to engage with either the left-hand driving member 250 or the right-hand driving member 261. It will be noted that one will provide a drive which is in the reverse direction from the other by virtue of the idler arrangement 255, 256 and 257. The sleeve 263 is attached to an output shaft 265 and gears 266, 271, 272 which drive a lead screw 270 of the spindle translating mechanism. The lead screw 270 is adapted to drive the tool spindle by means of a drive connection indicated generally at 275.

In summary, it will be understood that all translatable elements of the machine tool, including the tool spindle, may be fed at a rate measurable either in inches per minute or inches per revolution of the spindle. The drive transfer clutch 120 affords selection therebetween, the coupling 123 of the clutch 120 being engageable with the right-hand input member 121 so that the transmission input shaft 126 is rotating at a rate measurable in revolutions per minute, or with the left-hand input member 122 so that the transmission input shaft is rotated via the power shaft 220 from the tool spindle at a rate measurable in revolutions per revolution of the spindle. Power is transmitted through the transmission unit 95 to the lead screws FS, TS, ES or HS, and by selective operation of the clutch 252 to the spindle translating means 275 in the headstock so as to cause such elements to travel at rates measurable in either inches per second or inches per tool spindle revolution depending upon the position of the drive transfer clutch 120.

We claim:

1. In a machine tool having a horizontal bed adapted to support elements translatable for positioning a workpiece with respect to a work tool, a vertical column supported adjacent said bed, a headstock movably mounted on said column, said headstock including a rotatable, translatable spindle element telescopingly disposed in said headstock and adapted to carry a work tool, means for providing a predetermined movement to each of the movable elements of the tool, including a motor carried by said headstock, a second motor disposed on said bed, a power transmission interconnecting said motor carried by said headstock with said spindle, and being shiftable to vary the speed of rotation thereof, and separate power transmission means interconnecting said second motor and each of said translatable elements on said bed and on said headstock, said separate power transmission means providing a plurality of selectable drive speeds to said elements, and means selectively interconnecting the two transmissions such that the elements normally powered by one transmission may be selectively powered by the other so that the input of said separate power transmission means is selectively varied, whereby the elements driven by said separate power transmission are driven at a rate in inches of travel per revolution of said spindle or in inches of travel per unit time.

2. In a machine tool having a bed adapted to support elements translatable for positioning a workpiece with respect to a work tool, a column supported for cooperation with said bed, a headstock movably mounted on said column, and a rotatable spindle element disposed in said headstock and adapted to carry a work tool, means for providing a predetermined movement to each of the movable elements of the machine tool, including a first power drive unit carried by said headstock, first power transmission means interconnecting said first power drive unit with said spindle and being shiftable to vary the speed of rotation thereof, a second power drive unit carried by said bed, second power transmission means interconnecting said second power drive unit with said translatable elements on said bed, said second power transmission means providing a plurality of selectable drive speeds to said translatable elements, and means selectively interconnecting said first and said second transmission means so that the elements normally powered by said second power drive unit at a rate in inches of travel per unit of time may be selectively powered by said first power drive unit at a rate in inches of travel per revolution of said spindle.

3. In a machine tool having a bed adapted to support elements translatable for positioning a workpiece with respect to a work tool, a column supported for cooperation with said bed, a headstock movably mounted on said column, and a rotatable and translatable spindle element disposed in said headstock and adapted to carry a work tool, means for providing a predetermined movement to each of the movable elements of the machine tool, including a first power drive unit carried by said headstock, first power transmission means interconnecting said first power drive unit with said spindle and being shiftable to vary the speed of rotation thereof, a second power drive unit carried by said bed, second power transmission means interconnecting said second power drive unit with said translatable elements on said bed and with said spindle, said second power transmission means providing a plurality of selectable drive speeds to said translatable elements, means selectively interconnecting said first and second transmission means so that said translatable elements and said spindle which are normally powered by said second power drive unit at a rate in inches of travel per unit of time may be selectively powered by said first power drive unit at a rate in inches of travel per revolution of said spindle.

4. In a machine tool having a bed adapted to support elements translatable for positioning a workpiece with respect to a work tool, a column supported for cooperation with said bed, a headstock movably mounted on said column, and a rotatable spindle element disposed in said headstock and adapted to carry a work tool, means for providing a predetermined movement to each of the movable elements of the machine tool, including a first motor carried by said headstock, first power transmission means interconnecting said first motor with said spindle and being shiftable to vary the speed of rotation thereof, a second motor carried by said bed, second power transmission means interconnecting said second motor with said translatable elements on said bed and including a plurality of independently supported interconnected drive trains, one of which comprises a plurality of interchangeable planetary systems, said planetary systems being fluid shiftable, and supported on a manifold pressure plate having a plurality of fluid passages selectively connectable with a source of fluid pressure for effecting shifting of said trains, whereby the rate of translation of said translatable elements is varied, and means selectively interconnecting said first and second transmission means so that the elements normally powered by said second motor at a rate in inches of travel per unit of time may be selectively powered by said first motor at a rate in inches of travel per revolution of said spindle.

5. In a machine tool having a bed adapted to support elements translatable for positioning a workpiece with respect to a work tool, a column supported for cooperation with said bed, a headstock movably mounted on said column, and a rotatable and translatable spindle element disposed in said headstock and adapted to carry a work tool, means for providing a predetermined movement to each of the movable elements of the machine tool, including a first power drive unit carried by said headstock, first power transmission means interconnecting said first power drive unit with said spindle and being shiftable to vary the speed of rotation thereof, a second power drive unit carried by said bed, second power transmission means interconnecting said second power drive unit with said translatable elements on said bed, said second power transmission means providing a plurality of selectable drive speeds to said translatable elements, means selectively interconnecting said first and second transmission means so that said translatable element on said bed which are normally powered by said second power drive unit at a rate in inches of travel per unit of time may be selectively powered by said first power drive unit at a rate in inches of travel per revolution of said spindle, and means interconnecting said second transmission means with said translatable spindle so that said spindle may be powered either at a rate in inches of travel per unit of time or at a rate in inches of travel per revolution of said spindle.

References Cited by the Examiner

UNITED STATES PATENTS

| | | | |
|---|---|---|---|
| 1,909,564 | 5/33 | Armitage. | |
| 2,009,354 | 7/35 | Burrell. | |
| 2,241,014 | 5/41 | Hirronen | 77—3 |
| 2,284,758 | 6/42 | Morton | 77—3 |
| 2,358,088 | 9/44 | Lange. | |
| 2,428,309 | 9/47 | Gallimore | 77—3 |
| 2,548,188 | 4/51 | Armitage | 90—14 |
| 2,577,517 | 12/51 | Gallimore | 77—3 |
| 2,616,159 | 11/52 | Curtis | 29—64 |
| 2,748,665 | 6/56 | Senn | 90—21 |
| 2,887,906 | 5/59 | Grinage | 77—3 |

WILLIAM W. DYER, JR., *Primary Examiner.*